United States Patent
Shintaku et al.

(10) Patent No.: US 12,101,246 B2
(45) Date of Patent: Sep. 24, 2024

(54) FAILURE TRANSFER APPARATUS, FAILURE TRANSFER SYSTEM, AND FAILURE TRANSFER METHOD

(71) Applicant: NIPPON TELEGRAPH AND TELEPHONE CORPORATION, Tokyo (JP)

(72) Inventors: Kengo Shintaku, Musashino (JP); Shokei Kobayashi, Musashino (JP); Fumikazu Inuzuka, Musashino (JP); Kei Kitamura, Musashino (JP); Takuya Oda, Musashino (JP); Takafumi Tanaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 281 days.

(21) Appl. No.: 17/763,693

(22) PCT Filed: Sep. 30, 2019

(86) PCT No.: PCT/JP2019/038473
§ 371 (c)(1),
(2) Date: Mar. 25, 2022

(87) PCT Pub. No.: WO2021/064779
PCT Pub. Date: Apr. 8, 2021

(65) Prior Publication Data
US 2022/0345398 A1 Oct. 27, 2022

(51) Int. Cl.
*H04L 45/02* (2022.01)
*H04L 41/12* (2022.01)
*H04L 43/12* (2022.01)
*H04L 45/00* (2022.01)
*H04L 45/12* (2022.01)
*H04L 45/28* (2022.01)

(52) U.S. Cl.
CPC .............. *H04L 45/28* (2013.01); *H04L 45/12* (2013.01)

(58) Field of Classification Search
CPC ...... H04L 45/28; H04L 45/12; H04L 47/2458
USPC .............................................................. 370/225
See application file for complete search history.

(56) References Cited

U.S. PATENT DOCUMENTS 7,961,642 B2 * 6/2011 Agrawal ............... H04L 45/123
370/252
8,363,543 B2 * 1/2013 George ................. H04L 41/145
370/254

(Continued)

FOREIGN PATENT DOCUMENTS

JP 2005086530 A 3/2005
JP 201289923 A 5/2012

OTHER PUBLICATIONS

Sgambelluri et al. (Open flow-Based segment protection in Ethernet Networks) (Year: 2014).*

(Continued)

*Primary Examiner* — Maharishi V Khirodhar
(74) *Attorney, Agent, or Firm* — Harness, Dickey & Pierce, P.L.C.

(57) ABSTRACT

A transfer device includes a detection unit configured to detect a sign of a failure in a link between transfer devices, and a management unit configured to update a routing table to lower a priority of a path via the link when the sign of the failure is detected by the detection unit.

6 Claims, 19 Drawing Sheets

(56) References Cited

U.S. PATENT DOCUMENTS

| | | | |
|---|---|---|---|
| 9,485,172 B2* | 11/2016 | Yoshimoto | H04L 45/28 |
| 9,838,317 B1* | 12/2017 | Yadav | H04L 43/0829 |
| 10,959,157 B2* | 3/2021 | Francisco | H04W 40/02 |
| 2005/0055459 A1 | 3/2005 | Bamba | |

OTHER PUBLICATIONS

Memory and Load-aware Traffic Rerouting (MLTR) in OpenFlow-based SDN, May 2019 (Year: 2019).*
Fast Failover Mechanism for Software Defined Networking—OpenFlow based, 2014 (Year: 2014).*
Information Technology—Open System Interconnection—Basic Reference Model: The Basic model, ISO/IEC 7498-1, second edition, Jun. 15, 1996.
J. Moy, OSPF Version 2, Network Working Group Request for Comments: 2328, Apr. 1998.
Y. Rekhter et al., A Border Gateway Protocol 4 (BGP-4), Network Working Group Request for Comments: 4271, Jan. 2006.
J. Postel, Internet Control Message Protocol, DARPA Internet Program Protocol Specification, Network Working Group Request for Comments: 792, Sep. 1981.
A. Conta et al., Internet Control Message Protocol(ICMPv6) for the Internet Protocol Version 6 (IPv6) Specification, Network Working Group Request for Comments: 4443, Mar. 2006.

* cited by examiner

Fig. 2

| LINK STATE | COST VALUE |
|---|---|
| BIT ERROR RATE DEGRADATION DETECTION | 400 |
| RECEIVED POWER DEGRADATION DETECTION | 300 |
| INTER-LINK FIBER BENDING DETECTION | 200 |
| NORMAL | 100 |

Fig. 3

| LINK NUMBER | COST VALUE |
|---|---|
| 1 | 100 (NORMAL) |
| 2 | 100 (NORMAL) |
| 3 | 200 (INTER-LINK FIBER BENDING DETECTION) |
| 4 | 400 (BIT ERROR RATE DEGRADATION DETECTION) |

Fig. 5

| DESTINATION | PORT | COST VALUE |
|---|---|---|
| FIRST NETWORK | Port1 | – |
| SECOND NETWORK | Port1 | 200 |
| THIRD NETWORK | Port2 | 200 |
| FOURTH NETWORK | Port2 | – |

LTa

Fig. 6

| DESTINATION | PORT | COST VALUE |
|---|---|---|
| FIRST NETWORK | Port2 | - |
| SECOND NETWORK | Port1 | - |
| THIRD NETWORK | Port1 | 200 |
| FOURTH NETWORK | Port2 | 200 |

LTb

Fig. 7

| DESTINATION | PORT | COST VALUE |
|---|---|---|
| FIRST NETWORK | Port1 | 200 |
| SECOND NETWORK | Port2 | 200 |
| THIRD NETWORK | Port2 | – |
| FOURTH NETWORK | Port1 | – |

LTd

Fig. 8

| DESTINATION | PORT | COST VALUE |
|---|---|---|
| FIRST NETWORK | Port2 | 200 |
| SECOND NETWORK | Port2 | – |
| THIRD NETWORK | Port1 | – |
| FOURTH NETWORK | Port1 | 200 |

LTc

Fig. 10

| DESTINATION | PORT | COST VALUE |
|---|---|---|
| FIRST NETWORK | Port1 | - |
| SECOND NETWORK | Port1 | <u>500</u> |
| THIRD NETWORK | Port2 | 200 |
| FOURTH NETWORK | Port2 | - |

LTa

Fig. 11

| DESTINATION | PORT | COST VALUE |
|---|---|---|
| FIRST NETWORK | Port2 | - |
| SECOND NETWORK | Port1 | - |
| THIRD NETWORK | Port2 | 300 |
| FOURTH NETWORK | Port2 | 200 |

LTb

Fig. 12

| DESTINATION | PORT | COST VALUE |
|---|---|---|
| FIRST NETWORK | Port1 | 300 |
| SECOND NETWORK | Port2 | - |
| THIRD NETWORK | Port1 | - |
| FOURTH NETWORK | Port1 | 200 |

Fig. 13

| DESTINATION | PORT | COST VALUE |
|---|---|---|
| FIRST NETWORK | Port1 | 200 |
| SECOND NETWORK | Port2 | <u>500</u> |
| THIRD NETWORK | Port2 | - |
| FOURTH NETWORK | Port1 | - |

LTd

Fig. 18

| Bit | INFORMATION TO BE TRANSFERRED | VALUE |
|---|---|---|
| 1 | Reserved | |
| 2 | Reserved | |
| 3 | Local Degrade | 0 (NORMAL)/1 (WHEN DEGRADED) |
| 4 | Remote Degrade | 0 (NORMAL)/1 (WHEN DEGRADED) |
| 5 | RECEIVED POWER DEGRADATION (LOCAL) | 0 (NORMAL)/1 (WHEN DEGRADED) |
| 6 | RECEIVED POWER DEGRADATION (REMOTE) | 0 (NORMAL)/1 (WHEN DEGRADED) |
| 7 | FIBER BENDING (LOCAL) | 0 (NORMAL)/1 (WHEN DEGRADED) |
| 8 | FIBER BENDING (REMOTE) | 0 (NORMAL)/1 (WHEN DEGRADED) |

Fig. 19

| STATE | VALUE | BIT POSITION (200GE) | BIT POSITION (400GE) |
|---|---|---|---|
| RECEIVED POWER DEGRADATION (LOCAL) | 0 (NORMAL)/1 (WHEN DEGRADED) | am_mapped<2052> | am_mapped<1024> |
| RECEIVED POWER DEGRADATION (REMOTE) | 0 (NORMAL)/1 (WHEN DEGRADED) | am_mapped<2051> | am_mapped<1023> |
| FIBER BENDING (LOCAL) | 0 (NORMAL)/1 (WHEN DEGRADED) | am_mapped<2050> | am_mapped<1022> |
| FIBER BENDING (REMOTE) | 0 (NORMAL)/1 (WHEN DEGRADED) | am_mapped<2049> | am_mapped<1021> |
| BIT ERROR RATE DEGRADATION (LOCAL) | 0 (NORMAL)/1 (WHEN DEGRADED) | am_mapped<2055> | am_mapped<1027> |
| BIT ERROR RATE DEGRADATION (REMOTE) | 0 (NORMAL)/1 (WHEN DEGRADED) | am_mapped<2054> | am_mapped<1026> |

FAILURE TRANSFER APPARATUS, FAILURE TRANSFER SYSTEM, AND FAILURE TRANSFER METHOD

CROSS-REFERENCE TO RELATED APPLICATIONS

This application is a 371 U.S. National Phase of International Application No. PCT/JP2019/038473, filed on Sep. 30, 2019. The entire disclosure of the above application is incorporated herein by reference.

TECHNICAL FIELD

The present invention relates to a transfer device, a transfer system, and a transfer method.

BACKGROUND ART

A network layer, which is Layer 3 (L3) of Open System Interconnection (OSI) reference model, is a layer that manages an end-to-end communication path in a communication network (hereinafter simply referred to as a "network") (see NPL 1). Devices having this management function include, for example, transfer devices such as routers. Some transfer devices perform the transmission and reception of information with other transfer devices by a routing protocol to build a destination table called a routing table. Such a transfer device determines a port for transferring (forwarding) signals received from other devices on the basis of information of the routing table. Examples of routing protocols to be used in this case include Open Shortest Path First (OSPF, see NPL 2), Border Gateway Protocol (BGP, see NPL 3), and the like. The routing protocol to be used is determined depending on characteristics of the network to which the routing protocol is applied.

In the network, it is quite important to identify the point of failure occurring when the failure occurs in a physical communication line or a path that is a logical communication path. In general, in a network that is configured by using a transfer device, the point of failure occurring is often isolated by confirming the arrival of information. As a means for confirming the delivery of information, for example, ping or the like is used, which is a diagnostic program of a network according to Internet Control Massage Protocol (ICMP, see NPLs 4 and 5) protocol. Further, in recent years, techniques for achieving a more reliable network by prior prediction of the failure occurrence have been studied in order to increase efficiency of maintenance of networks.

CITATION LIST

Non Patent Literature

NPL 1: ISO/IEC 7898-1, "Information Technology-Open System Interconnection-Basic Reference Model: The Basic model", June 1994.
NPL 2: RFC2328, "OSPF Version 2", June 1998.
NPL 3: RFC4271, "A Border Gateway Protocol 4 (BGP-4)", January 2006
NPL 4: RFC792, "Internet Control Message Protocol", 1981
NPL 5: RFC4443, "Internet Control Message Protocol (ICMPv6) for the Internet Protocol Version 6 (IPv6) Specification", 2006

SUMMARY OF THE INVENTION

Technical Problem

In the existing prior prediction of failure occurrence a sign of failure occurrence is detected in a data link layer (L2) or a physical layer (L1), which is a layer lower than the network layer (L3). Thus, in the network layer, the failure occurrence may be hidden. Then, effects of the failure will not be apparent unless the occurred failure worsens greatly. Thus, there has been a problem of a signal being transferred by using a link with low reliability even when a sign of failure occurrence is detected.

In view of the above-described circumstances, an object of the present invention is to provide a technology capable of performing more reliable communication.

Means for Solving the Problem

One aspect of the present invention is a transfer device including a detection unit configured to detect a sign of a failure in a link between transfer devices, and a management unit configured to update a routing table to lower a priority of a path via the link when the sign of the failure is detected by the detection unit.

Further, one aspect of the present invention is a transfer system including a control device and a plurality of transfer devices, in which the control device includes a detection unit configured to detect a sign of a failure in a link between the transfer devices, and a management unit configured to update a routing table included in the transfer devices to lower a priority of a path via the link when the sign of the failure is detected by the detection unit.

Further, one aspect of the present invention is a transfer system including a plurality of transfer devices and at least one transmission device that constitutes a link between the transfer devices, in which the transmission device is configured to detect a sign of a failure in the link between the transfer devices and notifies the transfer device of information indicating a detection result when the sign of the failure is detected.

Further, one aspect of the present invention is a transfer method including detecting a sign of a failure in a link between transfer devices and updating a routing table to lower a priority of a path via the link when the sign of the failure is detected.

Effects of the Invention

According to the present invention, more reliable communication can be performed.

BRIEF DESCRIPTION OF DRAWINGS

FIG. 2 is a diagram illustrating an example of corresponding information managed by a link quality management unit 103 according to the first embodiment.

FIG. 3 is a diagram illustrating an example of the corresponding information managed by the link quality management unit 103 according to the first embodiment.

FIG. 5 is a diagram for explaining an example of routing by the transfer device 1 according to the first embodiment of the present invention.

FIG. 6 is a diagram for explaining an example of routing by the transfer device 1 according to the first embodiment of the present invention.

FIG. 7 is a diagram for explaining an example of routing by the transfer device 1 according to the first embodiment of the present invention.

FIG. 8 is a diagram for explaining an example of routing by the transfer device 1 according to the first embodiment of the present invention.

FIG. 10 is a diagram for explaining an example of routing by the transfer device 1 according to the first embodiment of the present invention.

FIG. 11 is a diagram for explaining an example of routing by the transfer device 1 according to the first embodiment of the present invention.

FIG. 12 is a diagram for explaining an example of routing by the transfer device 1 according to the first embodiment of the present invention.

FIG. 13 is a diagram for explaining an example of routing by the transfer device 1 according to the first embodiment of the present invention.

FIG. 18 is a diagram illustrating a method for transferring information by the transfer system TS2 according to the third embodiment of the present invention.

FIG. 19 is a diagram illustrating a method for transferring information by the transfer system TS2 according to the third embodiment of the present invention.

DESCRIPTION OF EMBODIMENTS

First Embodiment

Hereinafter, a first embodiment of the present invention will be described with reference to the drawings.

Figure 1:
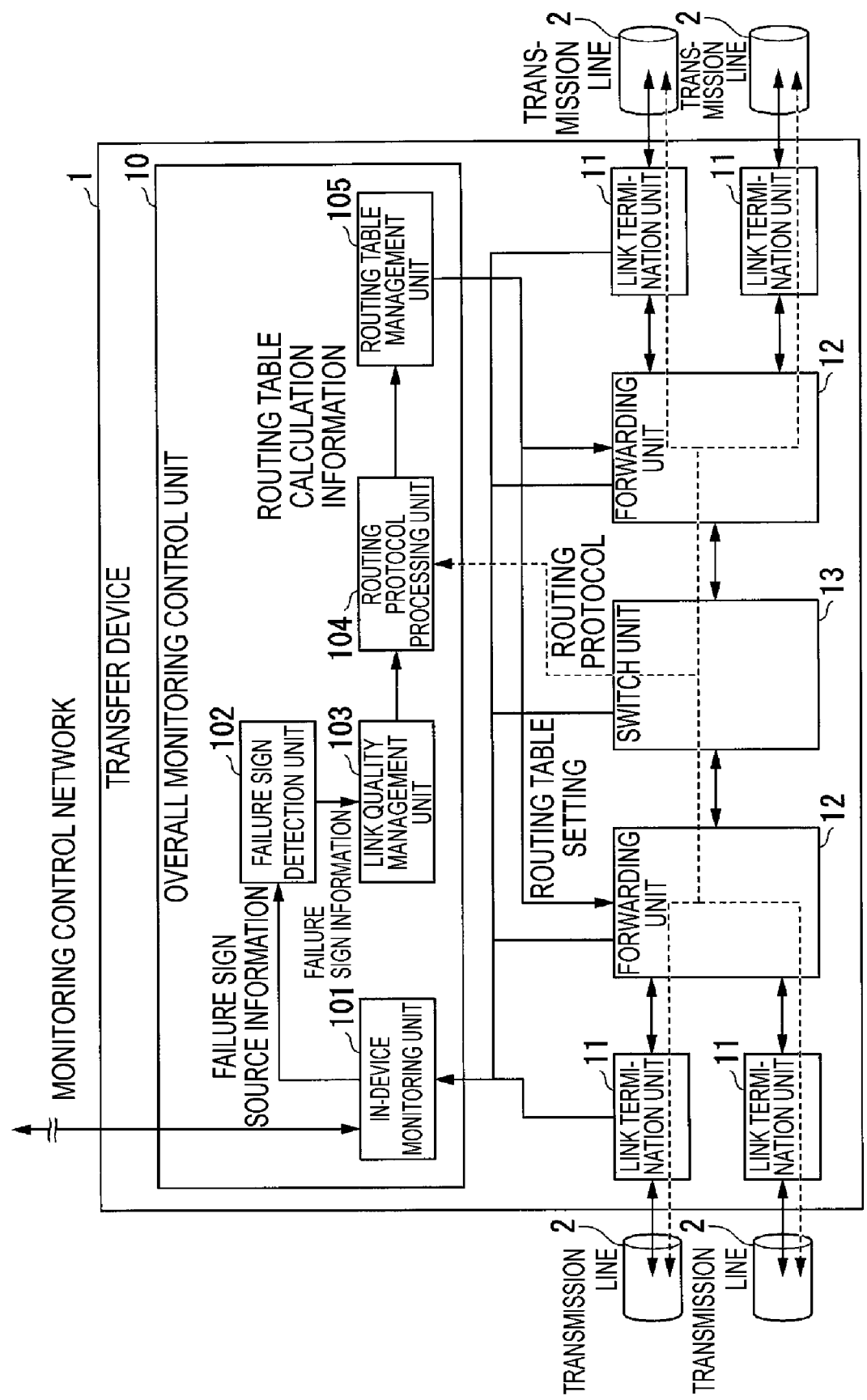
FIG. 1 is a block diagram illustrating a configuration of a transfer device 1 according to a first embodiment of the present invention.

FIG. 1 is a block diagram illustrating a configuration of a transfer device 1 according to the first embodiment of the present invention. The transfer device 1 includes an overall monitoring control unit 10, a plurality of link termination units 11, a plurality of forwarding units 12, and a switch unit 13.

Each of the plurality of link termination units 11 is connected to different transfer devices 1 via transmission lines 2. The transmission lines 2 are physical cables such as optical fibers. The link termination unit 11 includes an interface function that terminates a signal (hereinafter referred to as a "main signal") indicating communication data to be transferred in a network.

The forwarding unit 12 performs processing (for example, transfer processing) on the incoming main signal. Further, the forwarding unit 12 performs processing such as reference to a routing table managed by a routing table management unit 105 described below, specification of an interface of the output destination (link termination unit 11), preferential control by quality of service (QoS), and the like.

The switch unit 13 performs transfer processing of a signal between the plurality of forwarding units 12.

The overall monitoring control unit 10 performs management of setting information in the entire transfer device 1, management of routing tables, processing based on routing protocols, monitoring states of respective functional units of the transfer device 1, various setting processing based on an instruction from an external device, and query processing, alert processing, and the like by Simple Network Management Protocol (SNMP) or the like.

As illustrated in FIG. 1, the overall monitoring control unit 10 includes an in-device monitoring unit 101, a failure sign detection unit 102, a link quality management unit 103, a routing protocol processing unit 104, and a routing table management unit 105.

The in-device monitoring unit 101 performs state monitoring in the transfer device 1. The in-device monitoring unit 101 collects information indicating the state of each of the functional units included in the transfer device 1 and performs query processing, alert processing, and the like by the SNMP or the like on the basis of the information.

Further, the in-device monitoring unit 101 collects information used to detect a quality degradation of a link and a sign of a fault of the transfer device 1 or the transmission line 2 from each functional unit included in the transfer device 1. The failure sign source information is, for example, warning information (warning) or the like output from each functional unit included in the transfer device 1.

Note that, in the following description, the quality degradation of a link and the fault of the device, or the like are collectively referred to as a "failure". Further, the fault of the device referred to here is a fault of the transfer device 1, a fault of a device constituting a path of the link including the transfer device 1 on the transmission side and the transfer device 1 on the reception side (for example, digital signal processor (DSP), and the like), a fault of the transmission line 2 between these devices, and the like.

The in-device monitoring unit 101 outputs the collected information to be used to detect a sign of the failure (hereinafter referred to as "failure sign source information") to the failure sign detection unit 102.

The failure sign detection unit 102 acquires the failure sign source information from the in-device monitoring unit 101. The failure sign detection unit 102 detects the sign of the failure on the basis of the failure sign source information. The failure sign detection unit 102 generates failure sign information based on a detection result. The failure sign information includes, for example, information indicating the link in which the sign of the failure is detected, information indicating a type of the sign of the failure, and the like. The failure sign information is information generated by the failure sign detection unit 102 when the sign of the failure is detected.

Note that the failure sign detection unit 102 may generate the failure sign information on the basis of information obtained from an external device and used to detect the sign of the failure (hereinafter referred to as "external failure sign source information"). The external failure sign source information may be physical state data of a signal acquired from, for example, a DSP for optical communication or the like. Further, the external failure sign source information may be information generated by network operation work by an operator. Alternatively, the external failure sign source information may be information in which these pieces of information are combined.

Note that the failure sign detection unit 102 may generate the failure sign information on the basis of the failure sign source information acquired from the in-device monitoring unit 101 and the external failure sign source information acquired via the monitoring control network.

Further, the failure sign detection unit 102 may transmit and receive the failure sign source information used to generate the failure sign information by, for example, an overhead of the main signal, or may transmit and receive via the monitoring control network. Note that when the failure sign source information is transmitted and received by the overhead of the main signal, it is assumed that the main signal has been communicated at the stage when the failure sign is detected.

Further, the failure sign detection unit 102 included in each transfer device 1 may acquire the failure sign information and the like generated by another transfer device 1 and generate the failure sign information using the acquired information. Note that the failure sign detection unit 102 may acquire the failure sign information generated by the other transfer device 1, for example, by the overhead of the main signal, or may acquire via the monitoring control network.

Note that the failure sign detection unit 102 may generate the failure sign information using various information analysis techniques on the basis of at least one of the failure sign source information collected by the own transfer device 1 or the external failure sign source information acquired from one or more external devices. Note that, for example, machine learning, deep learning, or the like may be used as the information analysis technique.

The failure sign detection unit 102 outputs the generated failure sign information to the link quality management unit 103.

The link quality management unit 103 acquires the failure sign information from the failure sign detection unit 102. On the basis of information indicating, for example, the link and the type of sign of the failure and the like indicated by the failure sign information, the link quality management unit 103 sets, updates, and manages cost values of the routing table corresponding to the information.

Specifically, for example, when the link quality management unit 103 acquires the failure sign information, the link quality management unit 103 generates information indicating the link for which the sign of the failure is detected and information indicating a cost value (hereinafter collectively referred to as "routing table calculation information"). At this time, the link quality management unit 103 generates the routing table calculation information on the basis of corresponding information managed by the link quality management unit 103. Note that, details of the corresponding information will be described below.

The link quality management unit 103 outputs the generated routing table calculation information to the routing protocol processing unit 104. Thus, the routing protocol processing unit 104 sets and updates the cost value of the routing table managed by the routing table management unit 105.

Among the functional units included in the overall monitoring control unit 10, the routing protocol processing unit 104 and the routing table management unit 105 are functional units that perform processing on routing.

The routing table management unit 105 acquires routing table calculation information from the link quality management unit 103. The routing table management unit 105 sets and updates the cost value of the routing table managed by the routing table management unit 105 on the basis of the acquired routing table calculation information.

Further, the routing protocol processing unit 104 terminates various routing protocols such as OSPF and BGP and advertises the cost value to the other transfer devices 1 constituting the network. In this case, the routing protocol processing unit 104 acquires, for example, information indicating the cost value of the routing table managed by the routing table management unit 105 and advertises the information.

The routing table management unit 105 inputs and outputs the routing table calculation information from and to the routing protocol processing unit 104. Thus, the routing table management unit 105 sets, updates, and manages the routing table. Further, the routing table management unit 105 sets and updates the forwarding unit 12 on the basis of the information of the routing table information.

The corresponding information managed by the link quality management unit 103 will be described below.

FIGS. 2 and 3 are diagrams illustrating an example of the corresponding information managed by the link quality management unit 103 according to the first embodiment.

The corresponding information illustrated in FIG. 2 is a table in which a link state is associated with a cost value of the routing protocol corresponding to the link state. For example, on the basis of the corresponding information illustrated in FIG. 2, the cost value advertised to the other transfer devices 1 (hereinafter, also referred to as an "advertising value") is determined.

Note that the advertising value may be determined in accordance with the link state in this manner or may be determined by other methods. For example, the advertising value may be determined depending on severity of the sign of the failure. For example, the advertising value may be determined by a function similar to Equation (1) below.

$$(\text{Advertising value}) = \alpha / R \quad (1)$$

Here, $R$ is a radius of curvature of the optical fiber between detected links. Further, $\alpha$ is a constant.

Furthermore, the corresponding information illustrated in FIG. 3 is a table in which an identification number identifying a link to which the transfer device 1 terminates and the cost value of the routing protocol corresponding to the link are associated with each other.

When the link quality management unit 103 acquires the failure sign information from the failure sign detection unit 102, the link quality management unit 103 specifies a link state indicated by the acquired failure sign information. Then, the link quality management unit 103 refers to the table illustrated in FIG. 2 and specifies the cost value corresponding to the link information specified above. Further, the link quality management unit 103 specifies the link number identifying the link indicated by the acquired failure sign information.

Then, the link quality management unit 103 refers to the table illustrated in FIG. 3 and retrieves the link number specified above. The link quality management unit 103 updates the cost value associated with the retrieved link number by the cost value specified above. That is, each row of the table illustrated in FIG. 3 serves as the routing table calculation information described above.

The link quality management unit 103 outputs the routing table calculation information to the routing protocol processing unit 104. The routing table management unit 105 updates the routing table managed by the routing table management unit 105 on the basis of the routing table calculation information acquired from the routing protocol processing unit 104. Thus, the updated cost value is advertised to the other transfer devices 1 that constitute the network.

A specific example of the routing performed by the transfer device 1 will be described below.

FIGS. 4 to 13 are diagrams for explaining an example of the routing by the transfer device 1 according to the first embodiment of the present invention.

Figure 4:
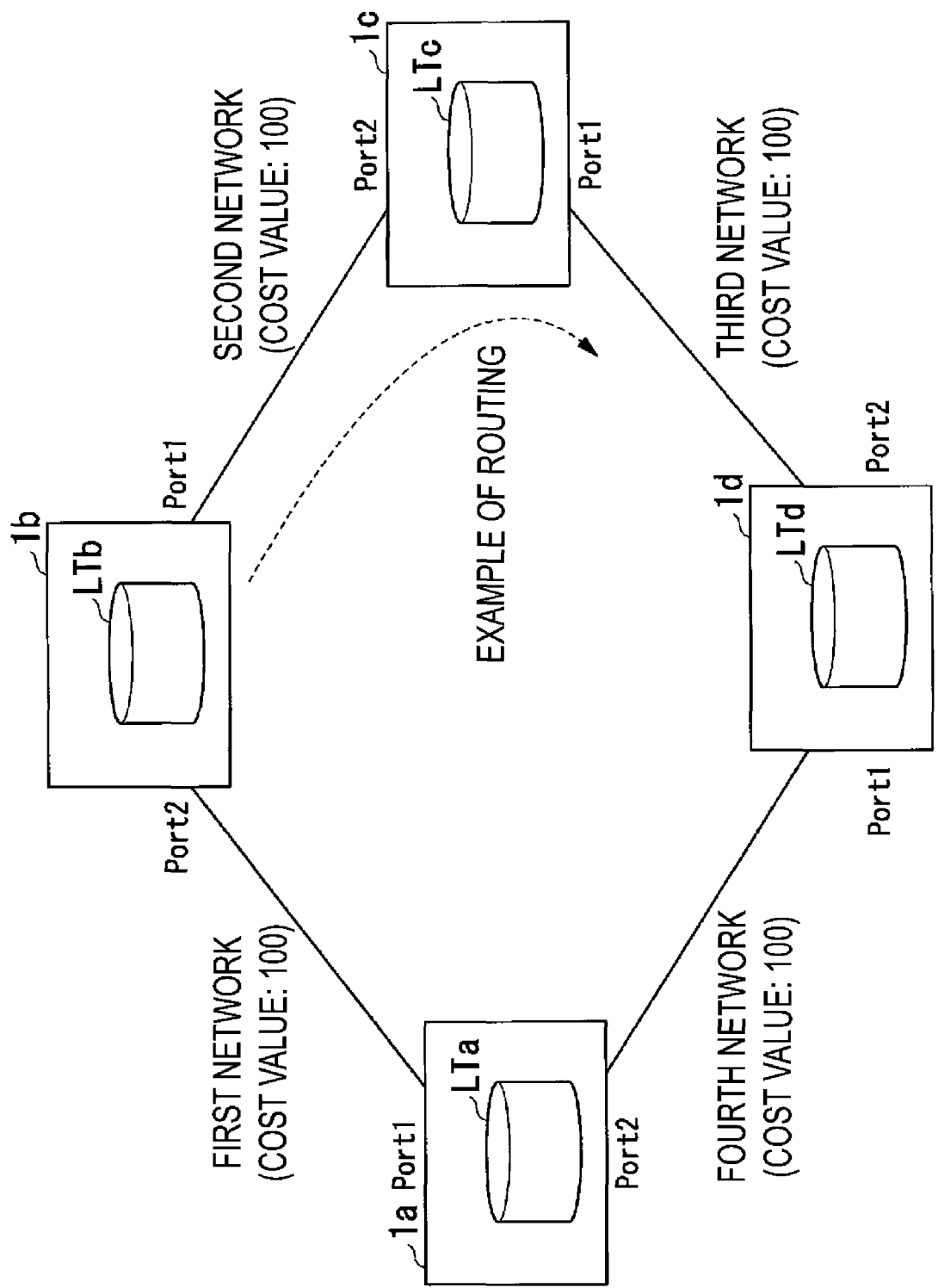
FIG. 4 is a diagram for explaining an example of routing by the transfer device 1 according to the first embodiment of the present invention.

As illustrated in FIG. 4, a network in which four transfer devices 1 (1*a*, 1*b*, 1*c*, 1*d*) are connected in a ring shape will now be described as an example. Each transfer device 1 is connected by a single link. Further, it is assumed that each link also belongs to a different network. That is, each link is given a different network address.

Note that in FIG. 4, the port numbers of ports ("Port1" and "Port2" in the diagram), which are an interface (I/F) for connecting to the link of each transfer device 1, are examples and not limited thereto. Further, in FIG. 4, the names of the networks ("first network", "second network", "third network", and "fourth network" in the diagram) are examples and not limited thereto.

As illustrated in FIG. 4, the transfer devices 1*a*, 1*b*, 1*c*, and 1*d* have routing tables LTa, LTb, LTc, and LTd, respectively. The port through which the main signal having arrived at the transfer device 1 is transferred is determined on the basis of these routing tables LTa to LTd.

FIG. 4 illustrates the network before the sign of the failure is detected. Further, FIGS. 5 to 8 illustrate the routing tables that the transfer devices 1*a* to 1*d* have, respectively, before the sign of the failure is detected. Note that FIG. 9, which will be described below, illustrates the network after the sign of the failure is detected. Moreover, FIGS. 10 to 13, which will be described below, illustrate the routing tables that the transfer devices 1*a* to 1*d* have, respectively, after the sign of the failure is detected.

It is assumed that, before the sign of the failure is detected, the cost value of the first network, which is the link terminated by the transfer device 1*a* and the transfer device 1*b*, is 100, as illustrated in FIG. 4. Similarly, it is assumed that the cost value of the second network, which is the link terminated by the transfer device 1*b* and the transfer device 1*c*, is 100. Similarly, it is assumed that the cost value of the third network, which is the link terminated by the transfer device 1*c* and the transfer device 1*d*, is 100. Similarly, it is assumed that the cost value of the fourth network, which is the link terminated by the transfer device 1*d* and the transfer device 1*a*, is 100.

In a representative routing protocol, OSPF, the transfer devices 1 exchange information indicating the cost values of the respective links with each other. Each of the transfer devices 1 then generates and updates the routing table by calculating each cumulative value of the cost value until reaching each network that is the destination of the main signal.

As an example, path determination in routing of the main signal transmitted from the transfer device 1*b* illustrated in FIG. 4 to the third network will be described below. The path from the transfer device 1*b* to the third network includes two paths, a path via the transfer device 1*a* and the transfer device 1*d* and a path via the transfer device 1*c*. For these two passes, a cumulative value of the cost value from the transfer device 1*b* until reaching the third network is calculated.

In a case of the path via the transfer device 1*a* and the transfer device 1*d*, because the cost value of the first network is 100, the cost value of the fourth network is 100, and the cost value of the third network is 100, the cumulative value of the cost value is 300. On the other hand, in a case of the path via the transfer device 1*c*, because the cost value of the second network is 100 and the cost value of the third network is 100, the cumulative value of the cost value is 200.

In the OSPF, a path having a smaller cumulative value of the cost values is preferentially selected. Thus, in the case of the example illustrated in FIG. 4, the path via the transfer device 1*c* will be preferentially selected. Information indicating the cumulative values of the cost values is stored in the routing table. In this manner, exchange of the cost values of the links between the respective transfer devices 1 and recalculation of the cumulative value of the cost value of each transfer device 1 are performed, thereby setting the routing table that each transfer device 1 has.

By the setting of the routing table described above, for example, the routing table LTa included in the transfer device 1*a* is set as illustrated in FIG. 5. As illustrated in FIG. 5, the routing table LTa is data in which, for example, the name of the destination network, the port name used, and (the cumulative value of) the cost value are associated with one another.

For example, it is illustrated that the Port1 is used for transfer of a signal from the transfer device 1*a* to the second network, and (the cumulative value of) the cost value in this case is 200 according to the calculation method described above. Further, for example, it is illustrated that the Port2 is used for transfer of a signal from the transfer device 1*a* to the third network, and (the cumulative value of) the cost value in this case is 200 according to the calculation method described above.

Note that for the routing table LTb illustrated in FIG. 6, the routing table LTc illustrated in FIG. 7, and the routing table LTd illustrated in FIG. 8, the port to be used and (the cumulative value of) the cost value are similarly associated with the destination network in accordance with the calculation method described above.

Note that each transfer device 1 autonomously determines whether to allow advertising to any other transfer devices 1 based on the link where a sign of a failure is detected and the type of sign of the failure, or the like. Further, each transfer device 1 also autonomously determines the cost value to advertise to the other transfer devices 1 based on the link where the sign of the failure is detected and the type of sign of the failure, or the like.

When the sign of the failure is detected, the transfer device 1 according to the present embodiment readvertises the cost value corresponding to the degree of the sign to the other transfer devices 1. Then, by each transfer device 1 updating the routing table, a load (amount of the main signal) of communication traffic in the path via the link where the sign has occurred is suppressed.

Figure 9:
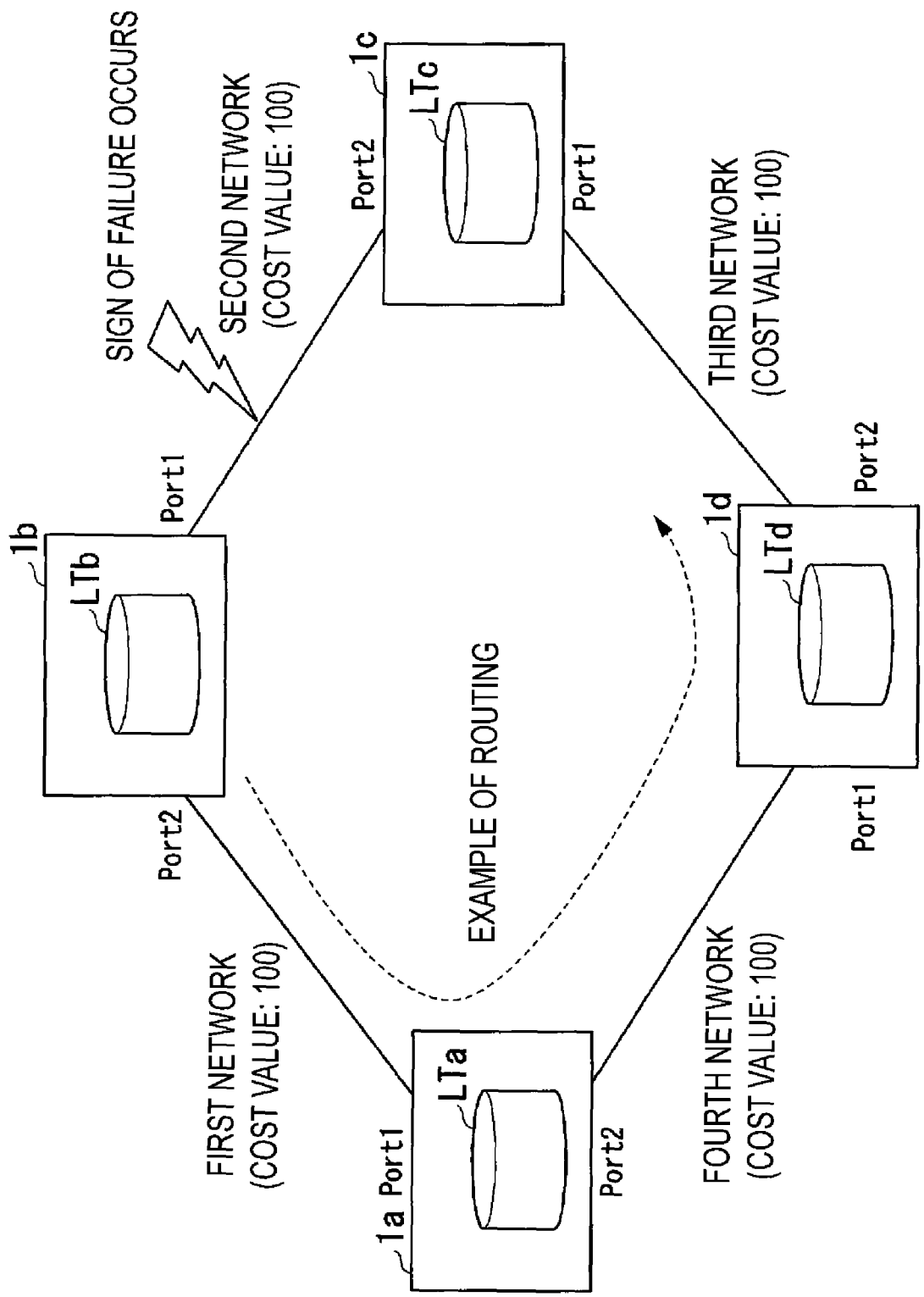
FIG. 9 is a diagram for explaining an example of routing by the transfer device 1 according to the first embodiment of the present invention.

FIG. 9 illustrates the network when the sign of the failure is detected between the transfer device 1*b* and the transfer device 1*c* from the state of the network illustrated in FIG. 4. The transfer device 1*b* and the transfer device 1*c*, which terminate the link where the sign of the failure is detected, set the cost value of the link in which the sign of the failure is detected higher. Note that, here, as illustrated in FIG. 9, it is assumed that the cost value of the second network in which the sign of the failure is detected is updated to 400.

Then, each of the transfer device 1*b* and the transfer device 1*c*, which terminate the second network in which the sign of the failure is detected, advertises the updated cost value to other transfer devices using various routing protocols, for example, OSPF and the like. In this manner, in each transfer device 1, the cost value included in the routing table is updated. Further, recalculation of the path is performed in response to the update of the cost value, and the ports included in the routing table are updated as necessary.

Path determination in the routing of the main signal transmitted from the transfer device 1b to the fourth network when a sign of a failure is detected in the link (second network) between the transfer device 1b and the transfer device 1c will be described below. As described above, the path from the transfer device 1b to the fourth network includes two paths, the path via the transfer device 1a and the transfer device 1d and the path via the transfer device 1c. For these two passes, the cumulative value of the cost value from the transfer device 1b until reaching the fourth network is calculated.

In the case of the path via the transfer device 1a and the transfer device 1d, because the cost value of the first network is 100, the cost value of the third network is 100, and the cost value of the fourth network is 100, the cumulative value of the cost value is 300. On the other hand, in a case of the path via the transfer device 1c, because the cost value of the second network is 400 and the cost value of the fourth network is 100, the cumulative value of the cost value is 500.

In this manner, the path through the transfer device 1a and the transfer device 1d, which is the path where the cumulative value of the cost value is smaller, is preferentially selected. Consequently, the communication traffic of the path via the second network where the sign of the failure has occurred is reduced. Thus, it is possible to perform more reliable communication.

FIG. 10 illustrates the routing table LTa illustrated in FIG. 5 updated by detecting the sign of the failure in the second network. Note that in FIGS. 10 to 13, data that has been updated is underlined. As illustrated in FIG. 10, because the cost value of the second network has been updated to 400, (the cumulative value of) the cost value of the path from the transfer device 1a to the second network is updated to 500.

In addition, FIG. 11 illustrates the routing table LTb illustrated in FIG. 6 updated by detecting the sign of the failure in the second network. As illustrated in FIG. 11, because the cost value of the second network has been updated to 400, (the cumulative value of) the cost value of the path from the transfer device 1b to the third network is updated to 300, and the port used is changed to the Port2.

In addition, FIG. 12 illustrates the routing table LTc illustrated in FIG. 7 updated by detecting the sign of the failure in the second network. As illustrated in FIG. 12, because the cost value of the second network has been updated to 400, (the cumulative value of) the cost value of the path from the transfer device 1c to the first network is updated to 300, and the port used is changed to the Port1.

Further, FIG. 13 illustrates the routing table LTd illustrated in FIG. 8 updated by detecting the sign of the failure in the second network. As illustrated in FIG. 13, because the cost value of the second network has been updated to 400, (the cumulative value of) the cost value of the path from the transfer device 1d to the second network is updated to 500.

Second Embodiment

Hereinafter, a second embodiment of the present invention will be described with reference to the drawings.

Figure 14:
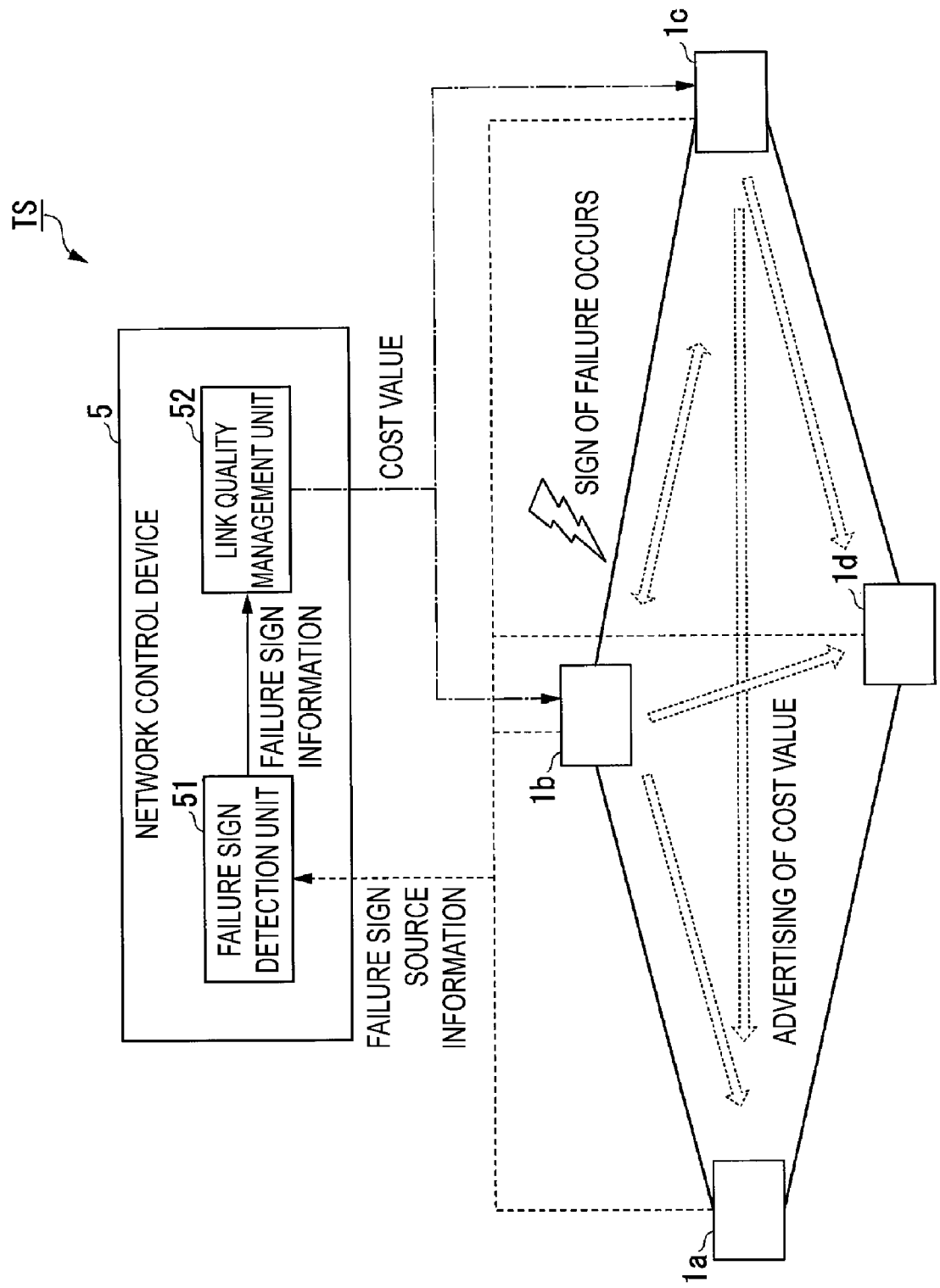
FIG. 14 is a diagram illustrating a configuration of a transfer system TS according to a second embodiment of the present invention.

FIG. 14 is a diagram illustrating a configuration of a transfer system TS according to the second embodiment of the present invention. Differences in configuration from the first embodiment will be mainly described below.

As described above, the transfer device 1 according to the first embodiment manages the cost value corresponding to the state of the link that the transfer device 1 terminates. Then, when the sign of the failure is detected, the transfer device 1 autonomously determines presence or absence of advertising to other transfer devices 1 and the cost value to advertise to the other transfer devices 1.

On the other hand, in the second embodiment, a network control device 5 manages the cost values of the links that the transfer devices 1 respectively terminates. Then, the network control device 5 updates the cost value corresponding to the link included in the routing table included in the transfer device 1. The transfer device 1 with the updated cost value advertises the updated cost value to each transfer device 1 constituting the network using various routing protocols.

As illustrated in FIG. 14, the network control device 5 includes a failure sign detection unit 51 and a link quality management unit 52.

The failure sign detection unit 51 collects, from each transfer device 1, failure sign source information, which is original information of failure sign information indicating a sign of a failure. The failure sign detection unit 51 detects the sign of the failure on the basis of the collected failure sign source information. When the sign of the failure is detected, the failure sign detection unit 51 generates the failure sign information including information indicating a link where the failure sign or the like has occurred, information indicating the state of the link, information indicating the transfer device 1 that terminates the link, and the like. The failure sign detection unit 51 outputs the failure sign information to the link quality management unit 52.

The link quality management unit 52 manages the corresponding information described above. The corresponding information is, for example, a table illustrated in FIG. 2 in which a link state and the cost value of the routing protocol corresponding to the link state are associated with each other. Further, the corresponding information is, for example, a table illustrated in FIG. 3 in which the link that the transfer device 1 terminates and the advertising value of the routing protocol corresponding to the link are associated with each other.

The difference from the first embodiment is that the link quality management unit 52 included in the network control device 5 collectively manages links terminated respectively by all the transfer devices 1 and the cost values associated with the links.

When the sign of the failure is detected in each transfer device 1, the link quality management unit 52 updates the cost value corresponding to the link in which the sign of the failure is detected. Furthermore, the link quality management unit 52 outputs information indicating the updated cost value to each transfer device 1 that terminates the link where the sign of the failure is detected. As illustrated in FIG. 14, for example, when the sign of the failure occurs in the network connecting the transfer device 1b and the transfer device 1c, information indicating the cost value is output to the transfer device 1b and the transfer device 1c.

Each transfer device 1 advertises a cost value to another transfer device 1 constituting the network when the information indicating the updated cost value is acquired. Further, the transfer device 1 also updates the routing table that the own transfer device 1 has.

Third Embodiment

Hereinafter, a third embodiment of the present invention will be described with reference to the drawings.

Figure 15:
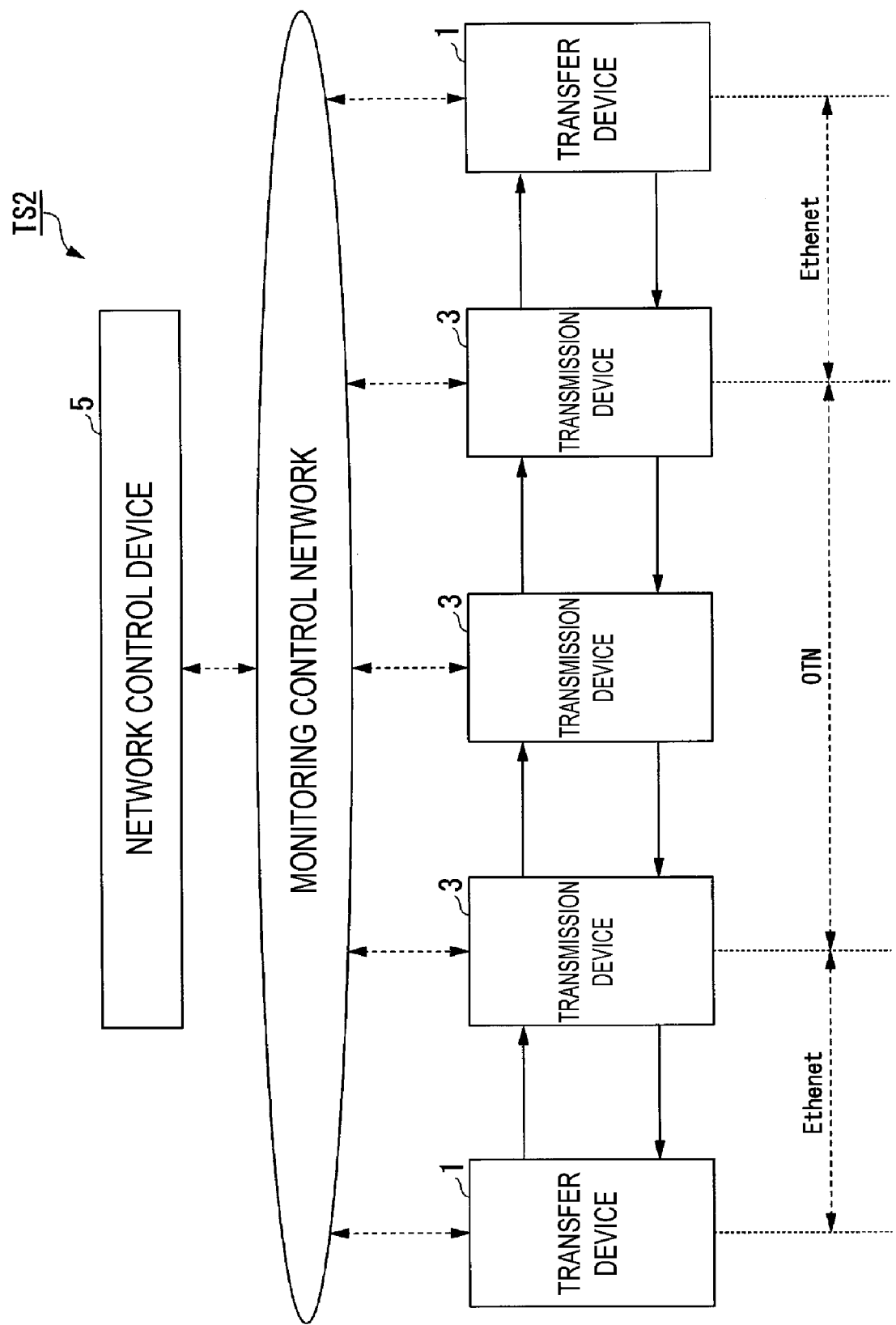
FIG. 15 is a diagram illustrating a configuration of a transfer system TS2 according to a third embodiment of the present invention.

FIG. 15 is a diagram illustrating a configuration of the transfer system TS2 according to the third embodiment of the present invention. Hereinafter, differences in configuration from the first embodiment and the second embodiment will be mainly described.

As illustrated in FIG. 15, a difference between the first and second embodiments described above and the third embodiment is that the links between the plurality of transfer devices 1 include a transmission device 3 for long-distance transmission. Note that, as illustrated in FIG. 15, a plurality of transmission devices 15 may be provided in the link between the plurality of transfer devices 1.

The link connecting a transfer device 1 and a transmission device 3 is constituted by Ethernet (trade name) defined in IEEE 802.3, for example. Further, the link connecting between the transmission devices 3 with each other includes an OTN defined in ITU-T G.709 or the like, for example. A method of conveying information performed between the plurality of transfer devices 1 when a sign of a failure occurs in an Ethernet section or an OTN section will be described below.

Figure 16:
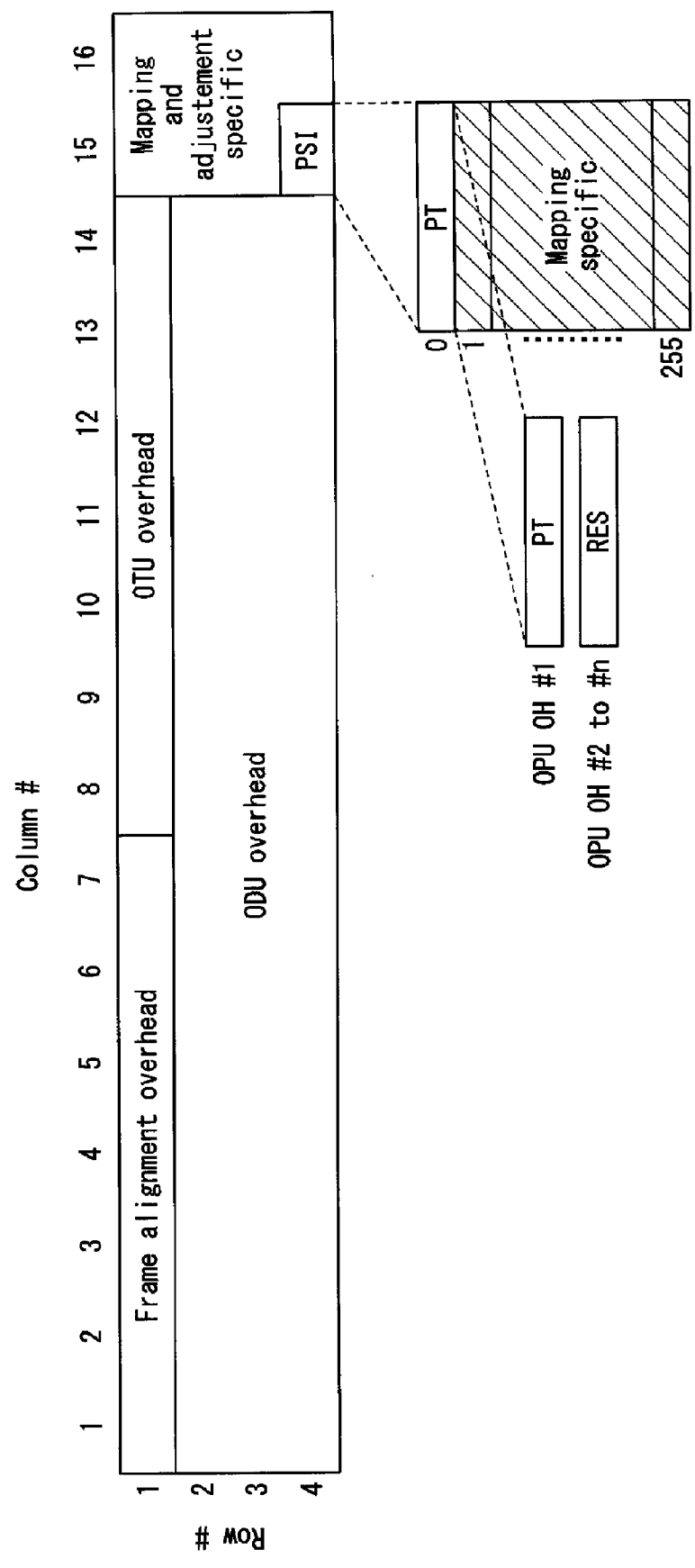
FIG. 16 is a diagram illustrating an overhead region of an OTN defined in ITU-T G.709.

FIG. 16 is a diagram illustrating an overhead region of the OTN defined in ITU-T G.709. In the OTN, this overhead region overlays the main signal and the OTN section is managed and monitored. The OTN overhead has a data size of four rows times 16 columns. It also has a data size of one byte (which equals to eight bits) in one row times one column.

As illustrated in FIG. 16, data from a first column to a seventh column of a first row is a frame alignment overhead indicating data for finding a head of the frame. Further, data from an eighth column to a 14th column of the first row is an OTU overhead indicating data managing a section terminated in every conversion (reproduction relay) between the optical signal and the electrical signal in the OTN section. Furthermore, data from the first to 14th columns in the data from a second row to a fourth row is an ODU overhead indicating data managing an end-to-end path of the OTN section. Data of a 15th column and a 16th column of each row is an OPU overhead indicating data managing a configuration of an accommodated path.

Further, a data region in the 15th column of the fourth row, included in the OPU overhead described above, is a payload structure identifier (PSI) region. The PSI region has a multi-frame structure. The multi-frame structure is a data structure configured such that a number is assigned to each frame in the order on a time axis in which the frame is transmitted, and the type of management information transmitted and received is different for each number of the frame. For example, in FIG. 16, when the frame number is No. 1, payload type (PT) information is transmitted. The PT information is information indicating what type of signal is contained.

Figure 17:
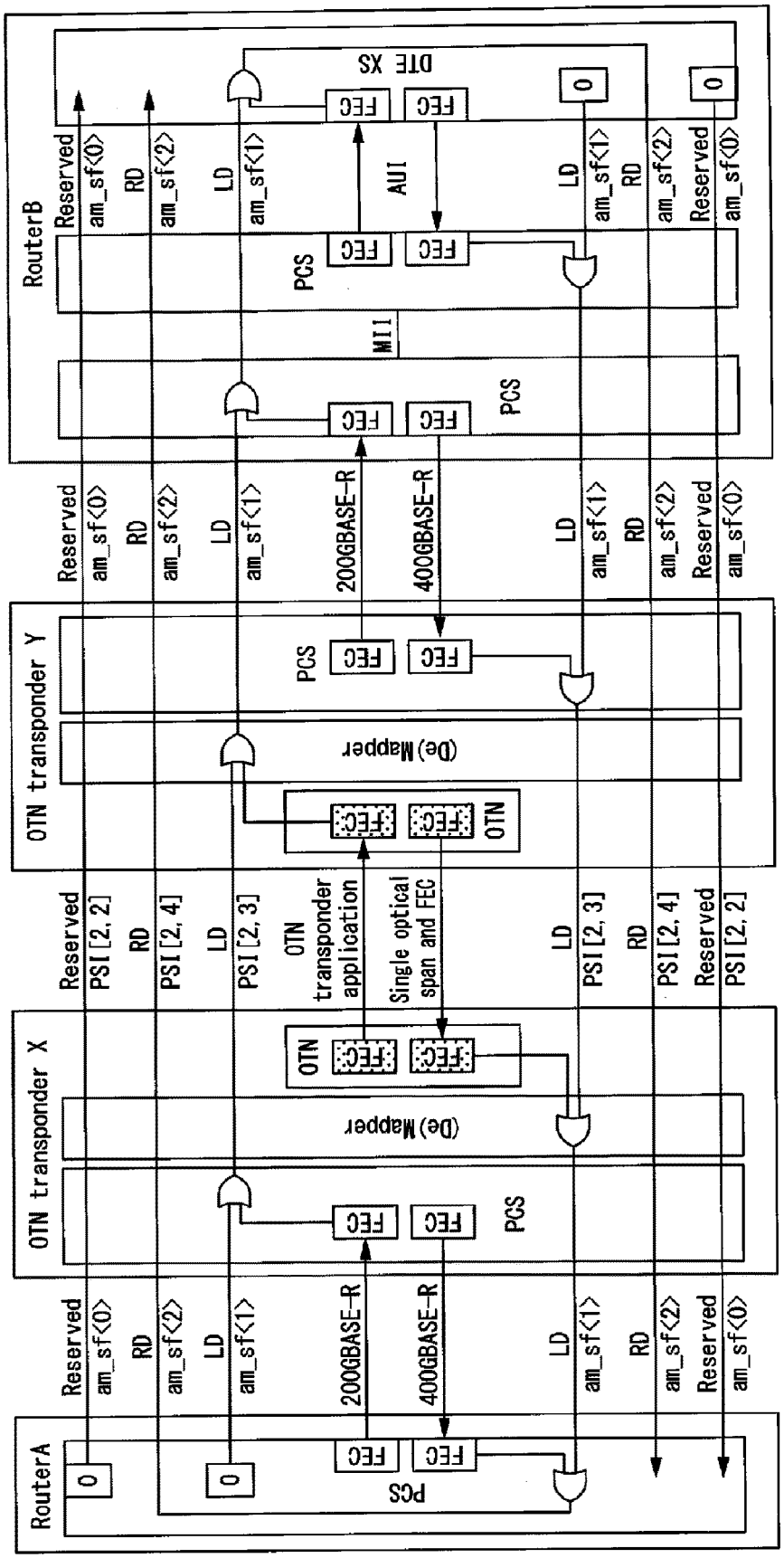
FIG. 17 is a diagram illustrating a method of transferring signal quality degradation information defined in Annex K of ITU-T G.709.

FIG. 17 is a diagram illustrating a method of transferring signal quality degradation information defined in Annex K of ITU-T G.709. Note that in FIG. 17, a router A and a router A are examples of the transfer device 1. Further, an OTN transponder X and an OTN transponder Y are examples of the transmission device 3.

As illustrated in FIG. 17, when the number of corrections of forward error correction code (FEC) is increased in the Ethernet section or the OTN section, local degrade (LD) information and remote degrade (RD) information are transferred. The local degrade information is stored and transferred in a third bit of the frame number No. 2 in the PSI region described above. Further, the remote degrade information is stored and transferred in a fourth bit of the frame number No. 2 in the PSI region described above.

Furthermore, in the Ethernet section, information corresponding to the local degrade information and the remote degrade information is stored and transferred in an alignment marker (AM) region of Ethernet.

When an increase in the number of corrections by the forward error correction code is detected in the transmission device 3, the transmission device 3 transfers the local degrade information in the forward direction (downstream direction) of the signal. The local degrade information is then detected by the transfer device 1. Next, the transfer device 1 that has detected the local degrade transfers the remote degrade information in the opposite direction (upstream direction) of the signal. In this manner, by exchanging the local degrade signal and the remote degrade signal between the devices, the transfer device 1 terminating a link can detect that a failure has occurred in this link.

In the present embodiment, the transfer function described above is further extended, and a configuration to transfer information indicating the type of sign of the failure to each transfer device 1 is employed.

A method of transferring quality degradation information in the OTN section according to the third embodiment will be described below.

FIG. 18 is a diagram for explaining the method of transferring information indicating the type of sign of the failure in the OTN section.

As with the transfer of the local degrade information and the remote degrade described above, the region of the second frame number of the multi-frame structure of the PSI region is used to transfer the information indicating the type of sign of the failure. For example, a fifth bit and a sixth bit in the region of the second frame number are used as a region for notifying the transmission device 3 that a deterioration in the received power of light has been detected. Further, a seventh bit and an eighth bit in the region of the second frame number are used as regions for notifying that fiber bending of the optical fiber in the transmission line 2 is detected.

Note that the type of notification described above is an example, and a configuration to notify of information indicating a type other than the type illustrated in FIG. 18 may be employed. Further, instead of using the region of the second frame number of the multi-frame structure of the PSI region, for example, a region from the third frame number may be used.

A method of transferring the quality degradation information in the Ethernet section will be described below. FIG. 19 is a diagram for explaining a method of transferring information indicating the type of sign of the failure in the OTN section.

As with the transfer of the local degrade information and the remote degrade described above, an AM region is used to transfer the information indicating the type of sign of the failure. For example, a 2051st bit and a 2052nd bit of the AM_mapped region of 200 G (gigabits) Ethernet is used as a region for notifying the transmission device 3 that a degradation of the received power of light has been detected in the transmitting device 3. Further, for example, a 2049th bit and a 2050th bit of the AM_mapped region are used as a region for notifying that fiber bending of the optical fiber in the transmission line 2 is detected.

Note that the type of notification described above is an example, and a configuration to notify of information indicating a type other than the type illustrated in FIG. 19 may be employed. Further, regions other than the above regions of the AM_mapped region may also be used.

With the above-described transfer method described with reference to FIGS. 18 and 19, each transfer device 1 located at both ends in FIG. 15 can detect that the sign of the failure has occurred. Further, the transfer device 1 can also be triggered by this detection to advertise the cost value of the routing protocol to other transfer devices 1.

As described above, the transfer device 1 in each of the embodiments described above readvertises the cost value of the routing protocol to other transfer devices 1 constituting the network when the sign of the failure is detected. At this time, the transfer device 1 re-advertises the cost value so that the priority of the path via the link where the sign is detected becomes low. Then, each of the transfer devices 1 recalculates the path on the basis of the routing table with the cost value updated by the readvertisement. Thus, a path to bypass the link where the sign is detected will be preferentially selected.

By including the configuration described above, the transfer device 1 in each embodiment of the present invention can reduce the amount of communication traffic in the detected link of the sign when the sign of the failure is detected. Thus, the transfer device 1 can perform more reliable communication.

Although the embodiment of the present invention has been described in detail with reference to the drawings, a specific configuration is not limited to the embodiment, and a design or the like in a range that does not depart from the gist of the present invention is included.

The transfer devices 1 in the above-described embodiments may be implemented by a computer. In this case, a program for realizing their functions may be recorded on a computer-readable recording medium and the program recorded on the recording medium may be read and executed by a computer system to achieve the functions. Note that the "computer system" as used herein includes an OS and hardware such as a peripheral device. In addition, the "computer-readable recording medium" refers to a portable medium such as a flexible disk, a magneto-optical disk, a read only memory (ROM), and a compact disk read only memory (CD-ROM), and a storage device such as a hard disk built into a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. The above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

1 Transfer device
2 Transmission line
3 Transmission device
5 Network control device
10 Overall monitoring control unit
11 Link termination unit
12 Forwarding unit
13 Switch unit
52 Link quality management unit
101 In-device monitoring unit
103 Link quality management unit
104 Routing protocol processing unit
105 Routing table management unit

The invention claimed is:

1. A transfer device comprising:
a processor; and
a storage medium having computer program instructions stored thereon, when executed by the processor, perform to:
detect a sign of a failure in a link between a plurality of the transfer devices; and
update a cost value in a routing table to lower a priority of a path via the link when the sign of the failure is detected; and
determine the cost value based on a radius of curvature of an optical fiber of the link between the plurality of transfer devices.

2. The transfer device according to claim 1, wherein when the sign of the failure is detected, the computer program instructions further perform to updates a cost value included in the routing table to increase the cost value of the link.

3. The transfer device according to claim 2, wherein the computer program instructions further perform to determines the cost value to be updated in accordance with a type of sign of the failure.

4. The transfer device according to claim 2, wherein the computer program instructions further perform to determines, based on at least one of a link in which the sign of the failure is detected or a type of sign of the failure, whether to allow advertising to another transfer device and a cost value to be advertised to the other transfer device.

5. A transfer system comprising:
a control device and a plurality of transfer devices, wherein
the control device includes
a detection unit configured to detect a sign of a failure in a link between the plurality of transfer devices, and
a management unit configured to update a cost value in a routing table provided in each of the plurality of transfer devices to lower a priority of a path via the link when the sign of the failure is detected by the detection unit and to determine the cost value based on a radius of curvature of an optical fiber of the link between the plurality of transfer devices.

6. A transfer method comprising:
detecting a sign of a failure in a link between transfer devices;
updating a cost value in a routing table to lower a priority of a path via the link when the sign of the failure is detected; and
determining the cost value based on a radius of curvature of an optical fiber of the link between the transfer devices.

* * * * *